Nov. 10, 1959     R. CLADE     2,912,219
HIGH PRESSURE SPHERICAL PLUG VALVE
Filed May 14, 1956     2 Sheets-Sheet 1
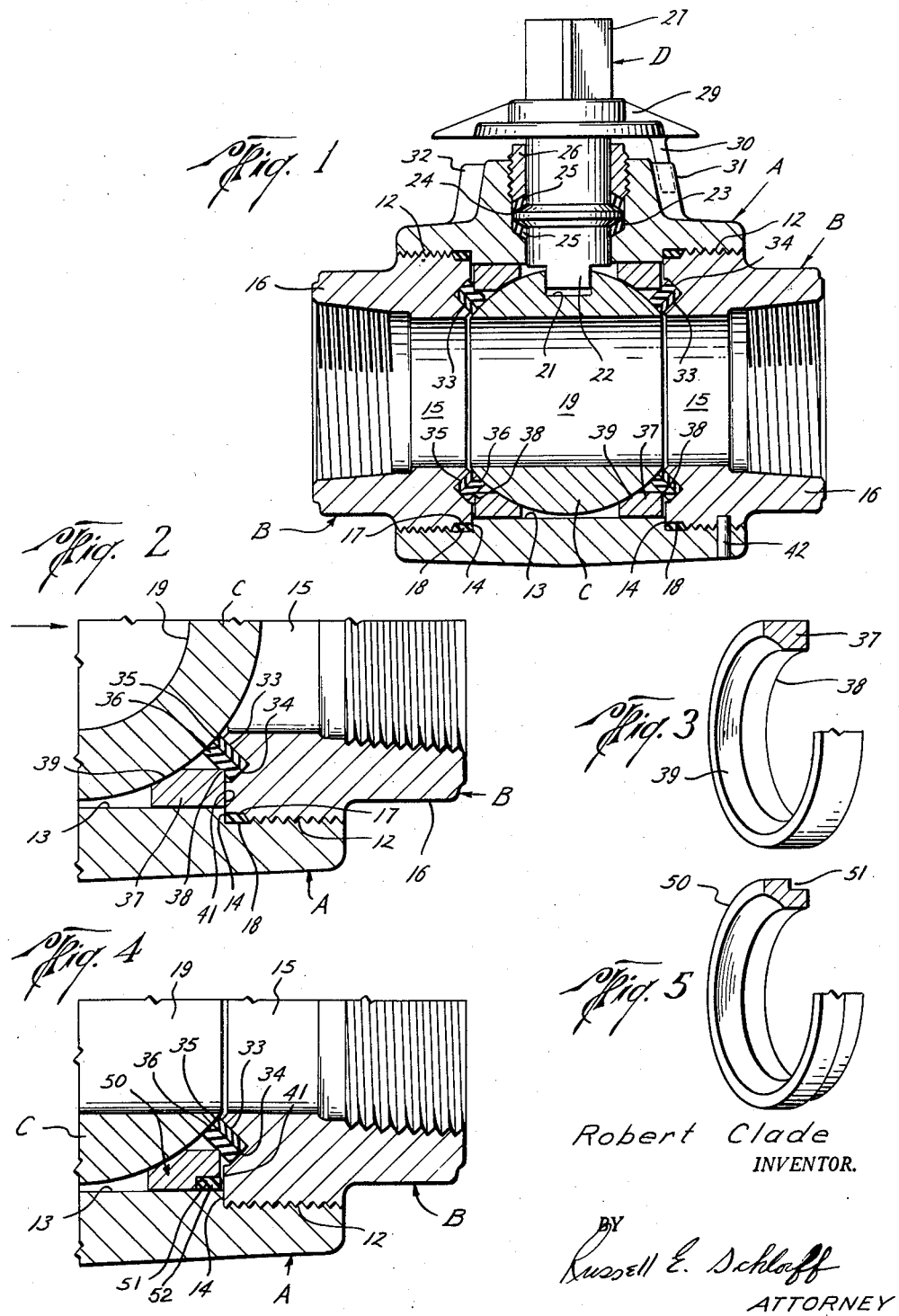
Robert Clade
INVENTOR.
BY
Russell E. Schloff
ATTORNEY

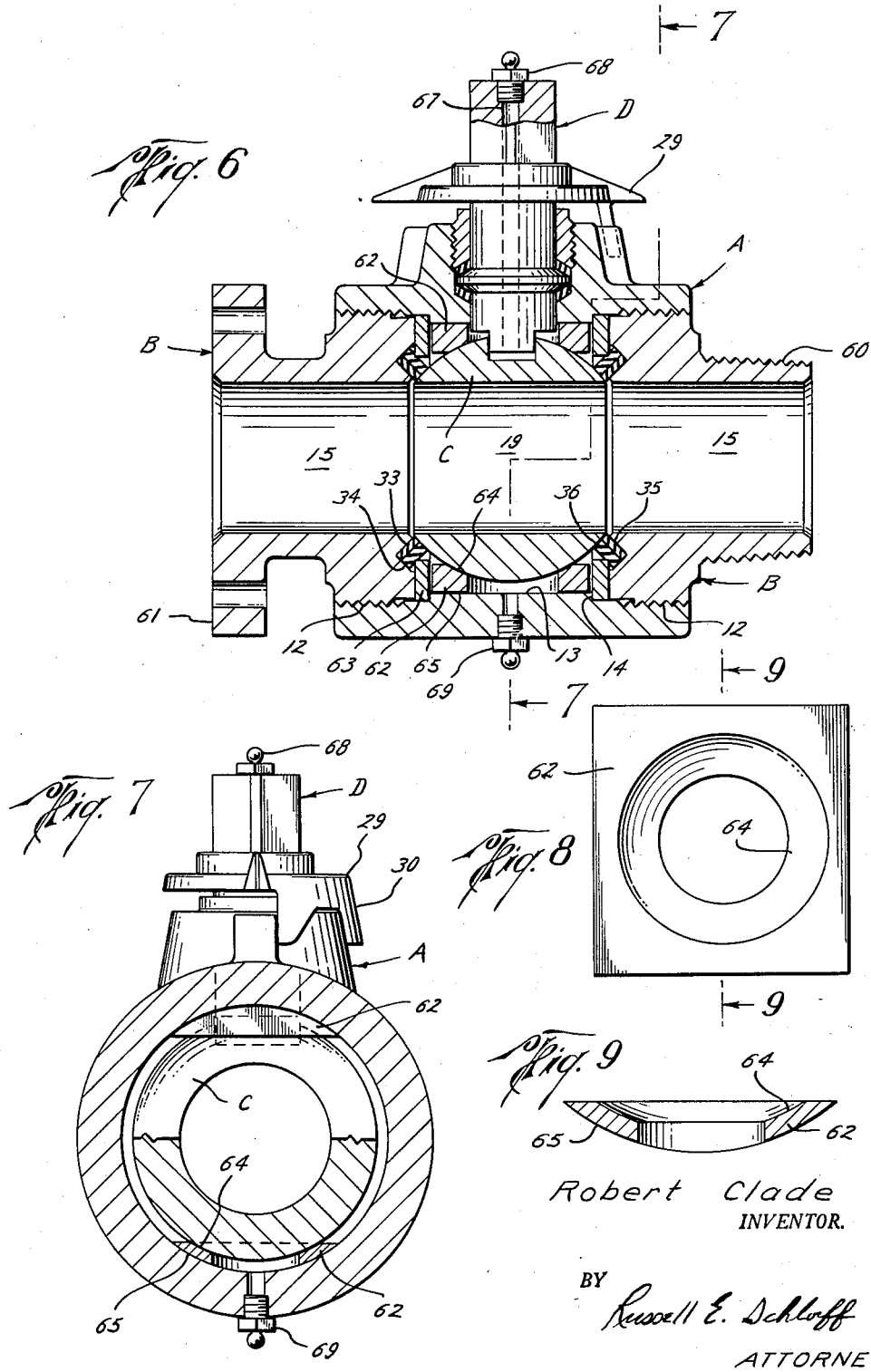

United States Patent Office 2,912,219
Patented Nov. 10, 1959

2,912,219

HIGH PRESSURE SPHERICAL PLUG VALVE

Robert Clade, Detroit, Mich., assignor, by mesne assignments, to ACF Industries, Incorporated, a corporation of New Jersey Application May 14, 1956, Serial No. 584,777

11 Claims. (Cl. 251—315)

This invention relates to a high pressure spherical plug valve.

My copending applications Serial No. 284,390 filed April 25, 1952, now Patent 2,762,601 issued September 11, 1956, and Serial No. 475,330 filed December 15, 1954, now Patent 2,861,773 issued November 25, 1958, disclose a spherical plug valve having resilient sealing members. Such a spherical plug valve is comprised essentially of a valve body having a bore therethrough, at least one closure fitting axially movable into an end of the body bore, a spherical plug rotatably mounted in the cavity of the body, and resilient sealing means contacting the spherical plug surrounding the flow passage. A more detailed description appears in the above-identified applications.

Valves made in accordance with the above-identified applications have proved most satisfactory in actual service; however, in designing a spherical plug valve of this type for high pressure service, a problem arose when polytetrafluoroethylene, known in the trade under the trade mark "Teflon" was utilized for forming the resilient sealing means. The problem resulted from the fact that "Teflon" will cold flow at approximately 1700 p.s.i. While one solution would have been to enlarge the bearing area of the Teflon gasket, and therefore, reduce the load per square inch, the resultant valve would have been too large for economical construction and use. The reason for the disproportionate increase in size is that as the area of the sealing means is increased other parts subject to pressure have to be correspondingly increased which in turn results in the necessity of increasing still other parts.

Instead of increasing the bearing area of the sealing means, the valve of the present invention has a thrust receiving means between the plug and the inner end of the port members to receive the excess thrust caused by high line pressure, thereby limiting the amount of thrust on the sealing means. In order to obtain proper sealing, the thrust receiving means were floatingly suspended; therefore, at low pressure the sealing means receive the thrust caused by line pressure, but as the pressure increases beyond the design limit of the sealing means, the thrust receiving means automatically comes into play and the excess thrust beyond the design limit of the sealing means is automatically transferred to the thrust receiving means. Since the thrust receiving means are floatingly suspended, there is at all times sufficient pressure on the sealing means to insure a proper seal.

It is an object of the present invention to provide a spherical plug valve provided with resilient sealing means capable of operating under high pressure.

It is another object of the present invention to provide in a spherical plug valve, floatingly suspended thrust receiving means which carry the excess thrust resulting from high line pressure.

It is a further object of the present invention to provide lubrication for the thrust carrying means.

It is a still further object of the present invention to provide a spherical plug valve of economical size capable of operating at high pressure.

The invention possesses many other advantages, and objects relating to details and economies of manufacture and use and other objects will be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Fig. 1 is a cross-sectional view of the valve of the present invention.

Fig. 2 is a fragmentary view of the valve of Fig. 1 in closed position under pressure.

Fig. 3 is an isometric view of the bearing seal of the valve shown in Fig. 1.

Fig. 4 is a fragmentary view showing a modified form of the bearing ring and body seal ring for the valve shown in Fig. 1 in the open position.

Fig. 5 is an isometric view of the bearing ring used in the form of valve shown in Fig. 4.

Fig. 6 is a longitudinal cross-sectional view of another form of valve of the present invention.

Fig. 7 is a transverse cross-sectional view taken along lines 7—7 of Fig. 6.

Fig. 8 is a plan view of the bearing plate of the valve shown in Fig. 6.

Fig. 9 is a cross-section of the bearing plate taken along 9—9 of Fig. 8.

Referring now to Fig. 1, the valve is comprised generally of a valve body A, a pair of fittings B, B and a spherical plug C, and stem D.

The valve body A is provided with a longitudinal bore. The ends 12, 12 of the bore are of a slightly larger diameter than the central portion 13 and are provided with threads to receive the fittings B, B which are axially movable toward the center of the body. The axial movement of each fitting B is limited by the shoulder 14 which is formed by the juncture of the central portion 13 and threaded portion 12 of the bore. Instead of having a threaded connection, the fitting may be telescoped into the outer end of the bore and provided with means permitting the fitting to be detachably secured to the valve body. Each fitting B is provided with a central axial passage 15, which is alined with the axis of the bore. The outer end 16 of fitting B is provided with a female thread adapted to mate with a male connection; however, the end of the fitting may be provided with male threads to mate with a female connection; may be formed with flanges for making a flanged connection or may be provided with any other desired type of end construction as is well known in the valve art. Inasmuch as both fittings are detachably connected to the valve body, inventory problems are lessened, since a fitting with any type of end construction can be used on the same body; therefore, it is unnecessary to maintain a supply of different types of body castings. A great amount of flexibility is possible without too great an inventory, and valves can be assembled to order as required. If desired, the inner end of each fitting B may have a circumferential recess 17 to provide space for a body seal ring 18 which is positioned in the recess 17 to prevent leakage of fluid from the body.

The spherical plug C is located in the central portion 13 of the bore and is the valving member of the valve, shutting off flow of fluid. The plug C has a passage 19 registerable with the passages 15, 15 of the fittings to permit flow in the open position. In order to receive the stem D, the plug has a transverse key way slot 21, which is milled across the top of the plug C. The slot 21 receives the end 22 of the stem D. The stem projects upwardly out of the valve body through a bore 23 in a boss on the top of the body. The bore 23 may be in the form of a counter bore. The stem D is provided with a shoulder 24 having tapered bearing surfaces. Packing rings 25, 25 may be placed on each side of the shoulder 24, and the stem assembly secured in position by a gland nut 26, which is threadingly engaged in the outer end of the bore 23. The gland nut 26 compresses the packing rings 25, 25 between itself, the tapered surfaces of the shoulder 24 and the bottom of the counter bore 23 to prevent leakage. The outer end 27 of the stem 20 may be provided with flats to receive a wrench for turning the stem. A stop ring 29 may be secured to the outer end of the stem, and provided with a projection 30 which contacts projections 31, 32 formed on the valve body A to limit the movement of the plug C.

To provide a supporting surface for the resilient sealing members, the inner end of each fitting B is machined to provide conical surfaces 33 diverging outwardly of the valve and joining the inwardly diverging conical surface 34. The sealing means are formed of a pair of annular rings 35, 36 which in their original shape are flat. The gaskets 35, 36 may be formed from Teflon or any other suitable gasket material. Either before or during assembly the gaskets are deformed to a conical shape and the seal ring 35 is supported in its deformed position on the conical surface 33. The seal ring 35 in turn supports the seat ring 36. The seal rings 35 are designed to project slightly inward of the seat rings 36 so that when the valve is assembled by bringing the spherical plug C to its seat on the seat ring 36, the spherical plug C presses against the inside circumference of seal ring 35 tensioning the seal ring; therefore, the seal ring will act in hoop tension to closely engage the spherical plug C and seal against leakage of fluid in either direction. The main bearing pressure is absorbed by the seat ring 36 while the seal ring 35 acts to stop any leakage which might pass the seat ring 36. In order to hold the sealing means in proper and predetermined position, an annular bearing ring 37 is provided. The inner circumferential corner 38 of one end of the ring 37 contacts the wall of the seat ring 36 and holds the sealing means in engagement with the conical surface 33 and the surface of the spherical plug C. As fully explained in my copending application S.N. 475,330, by clamping the seat ring along its center portion, the sealing members, especially if formed of Teflon will have clearance to move and therefore not be subject to permanent distortion.

The valve is so designed and assembled that there is sufficient initial compression on the gaskets 35, 36 to provide a seal for the valve. As line pressure acts upon the closed valve, the load on the gaskets is correspondingly increased and the gaskets are further compressed. To limit the amount of compression so that the gaskets will not be permanently distorted, the bearing ring 37 is so designed and arranged that it will receive the spherical plug and restrain it from exerting any pressure on the gaskets beyond their design limit. To accomplish this, the end of the bearing ring 37 opposite the clamping corner 38 is formed into a spherical surface 39 capable of receiving the spherical plug C and the bearing ring is floatingly suspended between the spherical plug C and the inner end 41 of Fig. 4 of the fitting B which acts as a stop for the ring 37. See Fig. 4. Therefore, in initial assembly, the ring 37 does not quite contact the stop 41, but does contact the spherical plug C and permits sufficient compression to be exerted on the sealing means to provide the necessary seal. As the line pressure increases and the gaskets are compressed, the bearing ring moves toward its stop 41, and as the pressure on the gaskets reaches the critical point the bearing ring has reached the stop 41 and thereafter, all further load of the plug is transferred to the thrust receiving means. Therefore, the gaskets 35, 36 are protected from receiving an excessive load, while at the same time they are still under sufficient compression to enable them to act as sealing members preventing leakage. When the valve is operating in the closed position at pressure less than that which will permanently distort the gaskets, the load of the plug is carried by the gaskets; however, as previously mentioned, if pressure exceeds such limit, the thrust receiving means automatically absorbs all further load. The difference between the position of the thrust receiving means under initial compression of the gaskets and the position of the bearing ring when it hits its stop at maximum compression of the gasket is the amount of float of the thrust receiving means. While this amount is relatively small, it is necessary so that in original assembly the gaskets can be placed under compression. The initial compression is controlled by the axial movement of the fitting toward the plug, and overload is prevented by end 41 of the fitting contacting the shoulder 14. If desired, a hole can be drilled into the body and fitting and a rollpin 42 or other suitable fastening means inserted to lock the fitting in position. This may be particularly advantageous to prevent loosening of the fitting when disconnecting the valve or pipe connected to the valve.

In Fig. 4 instead of having a circumferential recess on the inner end of the fitting B to provide space for a body seal ring, a bearing ring 50 is provided with a circumferential recess 51, to accommodate a body seal ring 52. The bearing ring 50 is fully illustrated in Fig. 5.

The valve illustrated in Figs. 6 and 7 is generally similar in construction and operation to the valve illustrated in Fig. 1 and the same reference characters used in Fig. 1 are utilized for similar parts. The end 61 of one fitting B is provided with a flange, and the end 60 of the other fitting B is provided with male threads as was previously mentioned in connection with Fig. 1. Instead of having the annular bearing rings 37, 37 disclosed in Fig. 1 bearing plates 62, 62 are utilized to receive the thrust of the plug C in case of excessive loads. Bearing plates 62, 62 operate in the same manner as the bearing rings 37, 37 previously described; however, a retainer ring 63 is utilized to contact the wall of the gaskets 36, 36 to retain the gaskets in clamping engagement. This is more fully described in my copending application S.N. 475,330. The bearing plates 62, 62 are floatingly suspended similar to the annular bearing rings 37, 37 of Fig. 1 and only come into play when the pressure on the gasket is such as would permanently distort them. Similarly to the bearing rings 37, 37, the plates are backed up by the inner ends of the fittings B, B, however, first contacting the retainer ring 63. The configuration of the bearing plate 62 is shown in Figs. 8–9. The surface 64 which contacts the spherical plug is cup shaped to mate with the plug C, and the outer surface 65 is formed to conform to the central portion 13 of body bore.

If desired, the form shown in Figs. 6 and 7 can be provided with means to lubricate the surface of the bearing plates 62, 62 which contact the spherical plug C thereby facilitating turning of the plug. To lubricate the bearing plates, a lubricant passage 67 is drilled in the stem 20 and the upper end of the passage is tapped to receive a lubricant fitting 68. A hole is likewise tapped in the bottom of the body A and receive a lubricant fitting 69, lubricant can then be inserted through the fittings 68 and 69. If desired, the inner end of each fitting B could be recessed to receive a body seal ring as described in connection with Fig. 1.

What I claim is:

1. In a high pressure spherical plug valve, a valve body assembly having a bore therethrough, a pair of fittings, each fitting having an opening therein alined with the axis of said bore, said fittings being axially movable into said body at one end of said bore and forming a part of said assembly, a spherical plug rotatably mounted in said body and having a flow passage therethrough adapted to be brought into and out of registry with the opening of the fittings, an annular groove formed in the inner end of each fitting about the opening, said groove being defined in part by an inwardly converging wall of truncated conical form, gaskets of cylindrical form having substantially flat side walls and of a width greater than the depth of said groove, said gaskets being adapted to be received in said grooves when distorted to conical form and to project therefrom into plug engaging position, and means floatingly suspended between the plug and fittings cooperating with the plug and fittings to receive any thrust beyond the design limit of the gaskets and restrain such thrust from being transmitted to the gaskets.

2. The valve as specified in claim 1 wherein a gasket is provided around the inner end of each fitting to prevent leakage of fluid.

3. In a high pressure spherical plug valve, a valve body assembly having a bore therethrough, a pair of fittings, each fitting having an opening therein alined with the axis of said bore, each fitting being axially movable into said body at one end of said bore and forming a part of said assembly, a spherical plug rotatably mounted in said body and having a flow passage therethrough adapted to be brought into and out of registry with the openings of the fittings, sealing means around the openings and contacting the plug in sealing engagement, and an annular bearing ring in the bore about the spherical plug, floatingly suspended between the spherical plug and the inner end of a fitting, the inner circumferential corner of one end in said ring contacting the sealing means and the inner circumference of the other end being formed to act as a bearing for the spherical plug.

4. In a high pressure spherical plug valve, a valve body assembly having a bore therethrough, a fitting having an opening therein alined with the axis of said bore, said fitting being axially movable into said body at one end of said bore and forming a part of said assembly, a spherical plug rotatably mounted in said body and having a flow passage therethrough adapted to be brought into and out of registry with the opening of the fitting, an annular groove formed in the inner end of the fitting about the opening, said groove being defined in part by an inwardly converging wall of truncated conical form, gaskets of cylindrical form having substantially flat side walls and of a width greater than the depth of said groove, said gaskets being adapted to be received in said grooves when distorted to conical form and to project therefrom into plug engaging position, and an annular bearing ring in the bore about the spherical plug, the inner circumferential corner of one end in said ring contacting the gaskets and the inner circumference of the other end being formed with a spherical surface to act as a bearing for the spherical plug, the bearing ring contacting the inner end of the fitting and receiving the plug thereby preventing excess load on the gaskets.

5. In a high pressure spherical plug valve, a valve body assembly having a bore therethrough, a fitting having an opening therein axially alined with said bore, an annular groove formed in the inner end of the fitting about the flow passage at each side of said spherical plug, said groove being defined in part by an inwardly converging wall of truncated conical form, gaskets of cylindrical form having substantially flat side walls and of a width greater than the depth of said groove, said gaskets being adapted to be received in said grooves when distorted to conical form and to project therefrom into plug engaging position, clamping means retaining the gaskets in sealing engagement with said spherical plug and a pair of bearing plates encompassing a portion of the top and bottom of said spherical plug in floating arrangements, said plates adapted to receive the excess thrust caused by line pressure when the valve is in closed position thereby preventing an excess load on the gaskets.

6. The valve as specified in claim 5 wherein means are provided to supply lubricant to the bearing plates.

7. In a high pressure spherical plug valve, a valve body having a bore therethrough, a spherical plug rotatably mounted in said body bore, a pair of fittings, each fitting being axially movable into said body at each end of said bore and having an opening therein alined with the axis of the body bore, said plug having a flow passage therethrough adapted to be brought into and out of registry with the openings of the fittings, a gasket receiving groove formed on the inner end of each fitting about the opening, a gasket received in said groove contacting the spherical plug in sealing relationship, and means floatingly suspended between the plug and fitting said means cooperating with said plug whereby any thrust in excess of the design load of said gasket is retrained from transmission to said gasket.

8. In a high pressure spherical plug valve, a valve body having a bore therethrough, a spherical plug rotatably mounted in said body bore, a pair of fittings, each fitting being axially movable into said body at each end of said passage and having an opening therein alined with the axis of the body bore, said plug having a flow passage therethrough adapted to be brought into and out of registry with the openings of the fittings, a gasket receiving groove formed on the inner end of each fitting about the opening, a gasket received in said groove contacting the spherical plug in sealing relationship, and an annular bearing ring floatingly suspended in the body bore about said plug, said ring having a portion contacting the gasket and applying initial compression on said gasket and having other portions cooperating with said plug and fitting whereby when the load upon said plug increases beyond the design limit of said gasket said means restrains such load from being transmitted to said gasket.

9. In a high pressure spherical plug valve, a valve body having a bore therethrough, a spherical plug rotatably mounted in said body bore, a pair of fittings, each fitting being axially movable into said body at each end of said bore and having an opening therein alined with the axis of the body said plug having a flow passage therethrough adapted to be brought into and out of registry with the body flow passages of the fittings, a gasket receiving groove formed on the inner end of each fitting about the flow passage, a gasket received in said groove contacting the spherical plug in sealing relationship, clamping means retaining the gaskets in sealing engagement with said spherical plug, and a pair of bearing plates encompassing a portion of the top and bottom of said plug in floating engagement between the plug and the fittings, said plates adapted to contact the spherical plug thereby carrying the excess thrust of the spherical plug caused by high line pressure when the valve is in the closed position thereby preventing the gaskets receiving an excessive load.

10. In a high pressure spherical plug valve, a valve body assembly having a bore therethrough, a fitting having an opening therein alined with the axis of said bore, said fitting being axially movable into said body at one end of said bore and forming a part of said assembly, a spherical plug rotatably mounted in said body and having a flow passage therethrough adapted to be brought into and out of registry with the opening of the fitting, sealing means around the opening between the inner end of the fitting and the spherical plug, and means floatingly suspended between the plug and fitting cooperating with the plug and fitting to receive any thrust beyond the design limit of the sealing means and restrain such thrust from being transmitted to the sealing means.

11. In a high pressure spherical plug valve having a body with a spherical plug therein and resilient sealing means between the plug and the body, means floatingly suspended between the plug and the body, said means cooperating with the plug and body to receive any thrust beyond the design limit of the sealing means and restrain such thrust from being transmitted to the sealing means.

References Cited in the file of this patent

UNITED STATES PATENTS

| | | |
|---|---|---|
| 934,614 | Huxley | Sept. 21, 1909 |
| 2,409,220 | Melichar | Oct. 15, 1946 |
| 2,751,185 | Shand | June 19, 1956 |
| 2,762,601 | Clade | Sept. 11, 1956 |
| 2,819,035 | Graham | Jan. 7, 1958 |